United States Patent [19]

Endoh et al.

[11] Patent Number: 4,922,545
[45] Date of Patent: May 1, 1990

[54] FACSIMILE IMAGE ENCODING METHOD

[75] Inventors: Toshiaki Endoh, Tanashi; Yasuhiro Yamazaki, Hiratsuka, both of Japan

[73] Assignee: Kokusai Denshin Denwa Kabushiki Kaisha, Tokyo, Japan

[21] Appl. No.: 310,026

[22] Filed: Feb. 10, 1989

Related U.S. Application Data

[63] Continuation of Ser. No. 31,149, Mar. 25, 1987, abandoned, which is a continuation of Ser. No. 736,464, May 21, 1985, abandoned.

[30] Foreign Application Priority Data

May 31, 1984 [JP] Japan ................... 59-109639

[51] Int. Cl.⁵ .............................................. G06K 9/00
[52] U.S. Cl. ...................................... 382/56; 358/426; 382/34
[58] Field of Search ................... 382/34, 56; 358/426, 358/432, 433

[56] References Cited

U.S. PATENT DOCUMENTS

| | | | |
|---|---|---|---|
| 4,410,916 | 10/1983 | Pratt | 358/261 |
| 4,494,150 | 1/1985 | Brickman | 358/260 |
| 4,499,499 | 2/1985 | Brickman | 358/260 |
| 4,606,069 | 8/1986 | Johnsen | 382/56 |
| 4,672,679 | 6/1987 | Freeman | 382/56 |
| 4,673,987 | 6/1987 | Toyokawa | 358/260 |

Primary Examiner—Leo H. Boudreau
Attorney, Agent, or Firm—Emmanuel J. Lobato; Robert E. Burns

[57] ABSTRACT

A facsimile image coding method in which a pattern appearing only once in the input image is encoded by the conventional facsimile coding method which sequentially scans the input image as a graphic element thereon for encoding, and a pattern appearing twice or more is encoded by encoding the positional coorinates and the identification code added at the time of registration in the pattern library as in the case of the pattern matching method. As a result of the above operations of the present invention, a high compression ratio, not only for a printed document but also for handwritten and graphic documents, is obtained.

2 Claims, 4 Drawing Sheets

FACSIMILE IMAGE ENCODING METHOD

This is a continuation of application Ser. No. 031,149, filed Mar. 25, 1987, now abandoned, which is a continuation of application Ser. No. 736,464, filed May 21, 1985, now abandoned.

BACKGROUND OF THE INVENTION

The present invention relates to a binary facsimile image signal coding method, and more particularly to a facsimile image signal coding method which is effective for efficient data compression of a printed document or the like.

In recent years facsimile has startlingly spread by virtue of its advantage that it is able to easily transmit, as images, any forms of documents with no limitations imposed thereon. Facsimile possesses the abovesaid advantage, but on the other hand, since it encodes data as photographic elements, the encoding efficiency is not high in case of complex documents. In particular, in a case where character elements such as printed characters are encoded using a conventional facsimile encoding system, the encoding efficiency is lower than 1/10 that in case of encoding character elements using character codes. In recent facsimile communications, documents containing printed characters are transmitted, and studies are now being made of an encoding system which permits high efficiency processing of such character data.

In general, the prior art described above achieves a high coding efficiency in a case where the same character pattern appears many times and a few number of library patterns are registered in a pattern library, as in the case of a printed document. For a handwritten document, a graphic document and so forth, however, since the number of appearances of the same pattern in these documents is extremely small, the coding efficiency of the above-mentioned prior art is lower than that of a two-dimensional coding system (Modified Read system) recognized as an international standard coding system by CCITT. According to this coding system, even a matching pattern which appears only once in the input image must be registered in pattern libraries on both the transmitting and the receiving side, and in particular, the graphic pattern must be sent from the transmitting side to the receiving side, together with the positional coordinates, the size and the identification code, so that the coding efficiency is lower than that obtainable with the two-dimensional coding system which sends only the graphic pattern in principle.

SUMMARY OF THE INVENTION

An object of the present invention is to provide a facsimile image coding method which achieves a high compression ratio not only for a printed document but also handwritten and graphic documents.

To attain the abovesaid object, the present invention is characterized in that a pattern appearing only once in the input image is encoded by the conventional facsimile coding system which sequentially scans the input image as a graphic element thereon for encoding, and a pattern appearing twice or more is encoded by encoding the positional coordinates and the identification code added at the time of registration in the pattern library as in the case of the pattern matching method.

BRIEF DESCRIPTION OF THE ACCOMPANYING DRAWINGS

The present invention will be described in detail below in comparison with prior art with reference to the accompanying drawings, in which.

DETAILED DESCRIPTION

To make differences between the present invention and prior art clear, an example of conventional methods will first be described.

Figure 1:
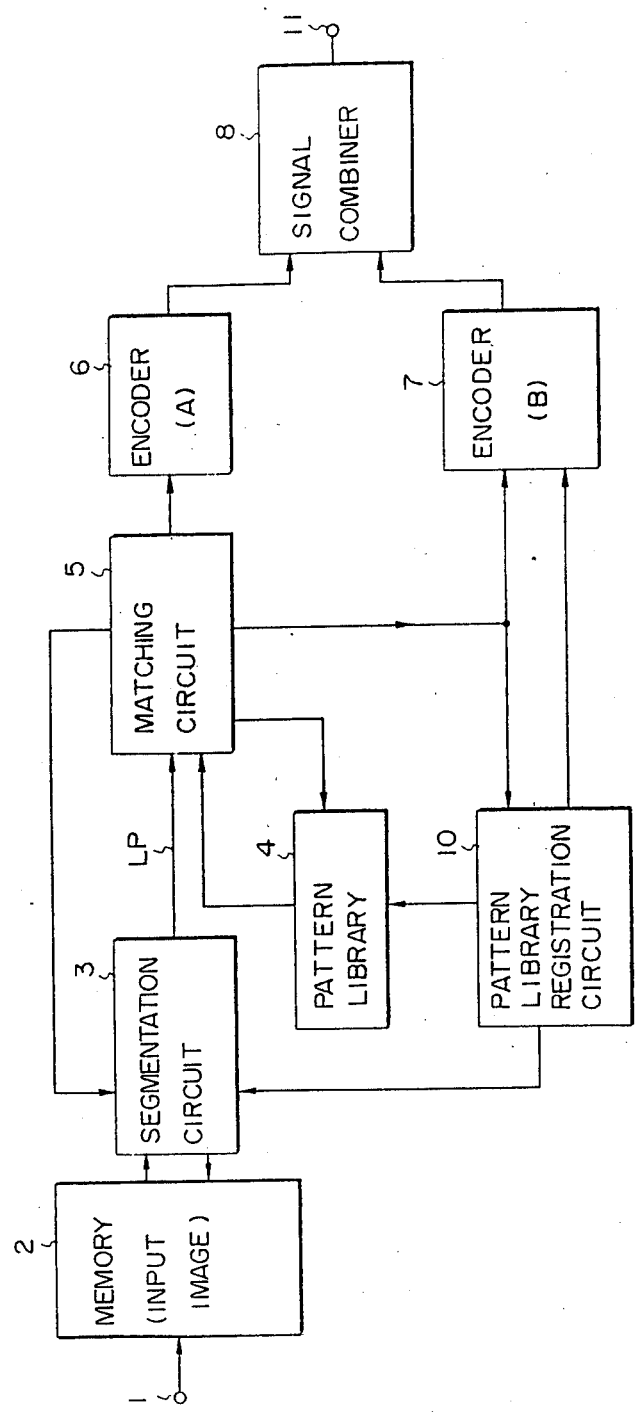
FIG. 1 is a block diagram showing an example of the arrangement of a conventional encoder according to a pattern matching method.

One prior art system of this kind is a pattern matching encoding system. FIG. 1 illustrates an example of the arrangement of an encoder of the conventional pattern matching method. In FIG. 1, reference numeral 1 indicates an input terminal for receiving binary facsimile image signals obtained by scanning an original document, 2 a memory for input image for storing the binary facsimile image signals from the input terminal 1 for each page or predetermined area of the original document, 3 a segmentation circuit for reading out the binary facsimile image signals from the (input image) memory 2 as matching patterns (MP) extracted in units of predetermined areas, 4 a pattern library for storing a number of library patterns (LP) which are used for the next comparison operation, 5 a matching circuit which compares the matching patterns (MP) With the library patterns (LP) in a sequential order and produces necessary signals corresponding to coincidence and non-coincidence between them as described later, 6 an encoder A for encoding the output of the matching circuit 5, 7 an encoder B for encoding the output of the matching circuit 5 and the output of a pattern library registration circuit 10 described later, 8 a signal combiner for combining the outputs of the encoders A and B to provide the combined output at an output terminal 11, and 10 a circuit by which the matching pattern (MP) decided as non-coincident as a result of the comparison by the matching circuit 5 is registered as a new library pattern (LP) in the pattern library 4.

The binary facsimile image signals applied to the input terminal 1 are once stored in the (input image) memory 2. The segmentation circuit 3 extracts image block data in units of characters, isolated black picture element areas or fixed rectangles from the input image data stored in the (input image) memory 2. The thus extracted image blocks are each called as MP (Matching Pattern). The MP is a graphic pattern which has positional coordinates indicating the position of the MP in the input image. The matching circuit 5 compares the MP with the library patterns (LP) which are sequentially read out of the pattern library 4 and tests similarity between the MP and the LPs. The LP is a graphic pattern given a pattern identification code (ID). When the MP and the LP bear a certain similarity, the matching circuit 5 decides that they are identical, and provides to the encoder (A) 6 the positional coordinates of the MP in the input image and the ID of the LP decided to be identical with the MP. That is to say, the MP composed of the positional coordinates and the graphic pattern is converted by the matching circuit 5 into a signal composed of the positional coordinates and the ID defined by the pattern library 4. Upon completion of the process for one MP, the matching circuit 5 commands the segmentation circuit 3 to extract a new MP.

On the other hand, in the event that a pattern identical with the MP being processed in the matching circuit 5 is not found in any of the LPs registered in the pattern library 4, the matching circuit 5 outputs the MP to the encoder (B) 7 and, at the same time, commands the pattern library registration circuit 10 to register the MP in the pattern library 4. In response to the command, the pattern library registration circuit 10 adds an individual ID to the MP in place of its positional coordinates and registers the pattern as a new LP in the pattern library 4. Further, the encoder (B) 7 is notified of the newly added ID. After the above process the matching circuit 5 commands the segmentation circuit 3 to extract the next MP. The encoder (B) 7 encodes the ID added by the pattern library registration circuit 10, the positional coordinates of the MP in the input image, the size (the height and width) of the MP and its graphic pattern. The above procedure is repeated until the signals (the images) stored in the (input image) memory 2 are all extracted. The signal combining circuit 8 sequentially provides signals from the encoders (A) 6 and (B) 7 to the output terminal 11.

On the other hand, the outline of the operation on the receiving side is as follows: Since a first image block has not been registered in the pattern library, a coded graphic pattern and its positional coordinates in the original image, the size (the height and width) of the pattern and the ID added at the time of registration in the library are transmitted from the transmitting side. The coded graphic pattern is decoded to the specified size of graphic pattern and at the position specified by the positional coordinates, and at the same time, the ID and the graphic pattern are registered in a pattern library. A graphic pattern which appeared previously has already been registered in the pattern library and, from the transmitting side, the positional coordinates of the graphic pattern and the ID of the graphic pattern are transmitted, so that it is necessary only to read out of the pattern library the graphic pattern specified by the ID and to place the graphic pattern at a specified position.

This prior art method has the above-mentioned defects.

With reference to the drawings, the present invention will hereinafter be described in detail.

Figure 2:
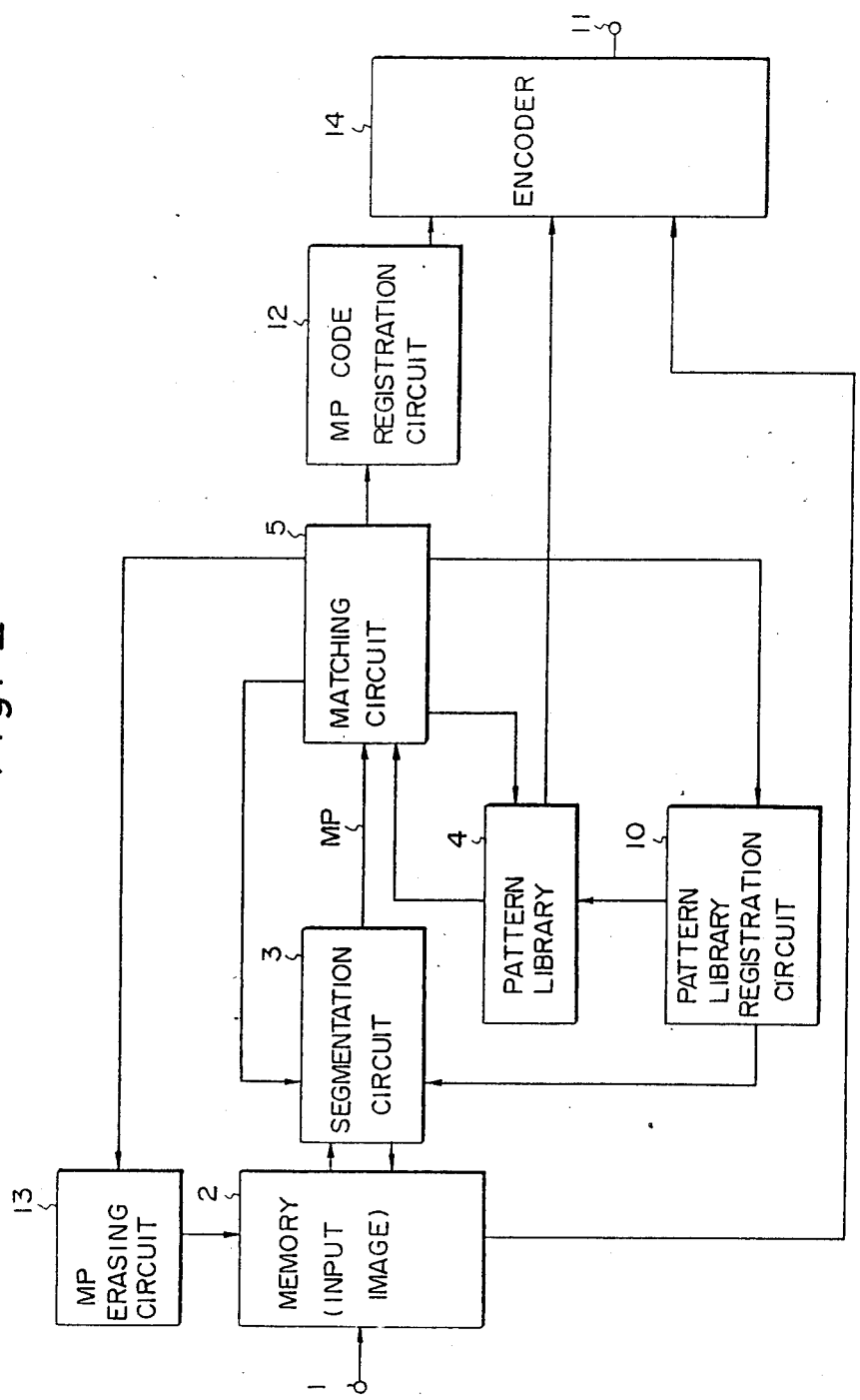
FIG. 2 is a block diagram illustrating an embodiment of the present invention.

FIG. 2 illustrates an embodiment of the encoder of the present invention. Reference numeral 1 indicates an input terminal, 2 a memory of input image, 3 a segmentation circuit, 4 a pattern library, 5 a matching circuit, 10 a pattern library registration circuit, 11 an output terminal, 12 an MP code registration circuit for registering an MP code to be transferred, 13 an MP erasing circuit for erasing from the stored image in the input image memory 2 the matching pattern (MP) for which the matching circuit 5 yields a coincidence output, and 14 an encoding circuit. In the above the circuits 1 to 5, 10 and 11 perform substantially the same operations as in the prior art example shown in FIG. 1. The illustrated embodiment differs from the prior art example mainly in the provision of the circuits 12, 13 and 14.

The segmentation circuit 3 extracts matching patterns (MP) in units of characters, isolated black picture elements areas or fixed rectangles from the stored image of the input image memory 2 in the same manner as described previously. The MPs thus extracted each have data on the positional coordinates in the input image and the size (the height and width). The matching circuit 5 tests similarly between the extracted MP and the library pattern LP registered in the pattern library 4, but in the initial state, no coincidence is detected between the patterns since the pattern library 4 is empty. When no LP of high similarity to the MP is found in the pattern library 4, the MP is provided to the pattern library registration circuit 10, by which it is registered as a new LP in the pattern library 4. This LP is in such a form that an individual ID is added to the MP, that is, the ID, the positional coordinates, the size and the graphic pattern constitute data of one LP. Upon completion of this registration, the pattern library registration circuit 10 commands the segmentation circuit 3 to extract the next MP. In this way, the MP for which no identical LP has been found by the matching circuit 5, including the initial state, is registered as a new LP in the pattern library 4, and consequently, a number of different library patterns (LP) are stored in the pattern library 4. When detecting coincidence between the MP and any one of the LPs in the pattern library 4, the matching circuit 5 provides the positional coordinates of the MP and the ID of the LP corresponding to the MP to the MP code registration circuit 12 and the positional coordinates, height and width of the MP to the MP erasing circuit 13. The pattern library 4 adds the number of appearances to the LP being compared with the MP. The MP code registration circuit 12 sequentially stores pairs of the positional coordinates and ID of the MPs. The MP erasing circuit 13 erases the MP from the input image memory 2 on the basis of the positional coordinates, height and width of the MP sent from the matching circuit 5. Upon completion of these operations, the matching circuit 5 commands the segmentation circuit 3 to extract the next MP.

After these operations are successively repeated until all MPs of the input image are processed, the encoding operation of the encoding circuit 14 is started. At the start of this encoding operation, the contents of the input image memory 2, the pattern library 4 and the MP code registration circuit 12 are as follows:

In the processing of the MPs in the input image memory 2, since the matching pattern which has appeared previously has already been erased, the same pattern does not exist in the input image memory 2 and only new patterns are present at the positional coordinates where they appear in the input image.

In the pattern library 4 patterns having newly appeared are registered as library patterns (LP) in the order of appearance after being each added with the positional coordinates in the input image, the pattern size, height and width, the ID and the number of appearances on the input image. The library patterns (LP) registered in the pattern library correspond to patterns remaining unerased in the input image memory 2.

In the MP code registration circuit 12 the LPs registered in the pattern library 4 are registered in the order of appearance in pairs of the positional coordinates in the input image and the IDs of the LPs.

Of the contents of the input image memory 2, the pattern library 4 and the MP code registration circuit 12, data sufficient for decoding the original image on the receiving side is encoded by the encoding circuit 14 using the smallest possible number of bits and delivered therefrom. The operation of the encoding circuit 14 comprises the following three steps.

(Step 1)

The contents of the (input image) memory 2 are encoded by the conventional facsimile coding system such as, for example, the aforementioned MR system and sent out. The receiving side, which has received this signal has received an image.

(Step 2)

The contents of the pattern library 4 are encoded and sent out. In this case, however, only those library patterns (LPs) which have appeared twice or more are encoded referring to the data on the number of appearances added to each library pattern (LP). The reason for this is that a library pattern (LP) having appeared only once had already been coded in step 1. Incidentally, the decision of the number of appearances may also be achieved by making the encoding circuit 14 decide whether the library pattern (LP) has been registered in the MP code registration circuit 12. Of the data of the LP to be encoded, only its positional coordinates, size and ID are encoded. The reason for this is that since the graphic pattern of the LP has already been sent out in step 1, the receiving side can obtain the graphic pattern of the LP by extracting a required pattern from the image received in step 1 on the basis of the data on the positional coordinates and size transmitted. In the case of encoding the ID of the LPs having appeared at a plurality of times, the encoding efficiency can be raised by assigning Huffman codes to them according to the number of appearances.

(Step 3)

The contents of the MP code registration circuit 12 are sequentially encoded and sent out.

Figure 3:
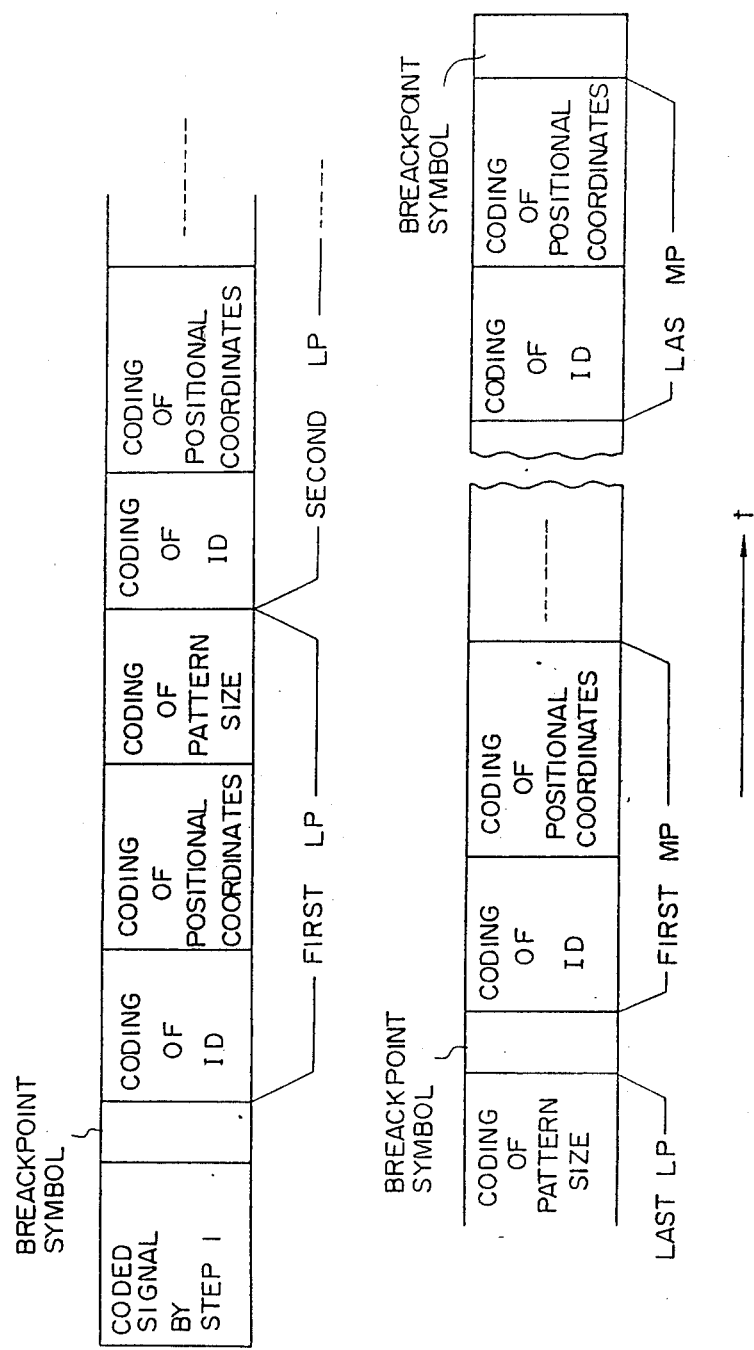
FIG. 3 is a timing chart explanatory of the transmission signal format for use in the present invention.

The above has described in detail the encoding method of the present invention. FIG. 3 shows, for example, the signal format which is sent out from the transmitting side, i.e. the encoding sequence.

Figure 4:
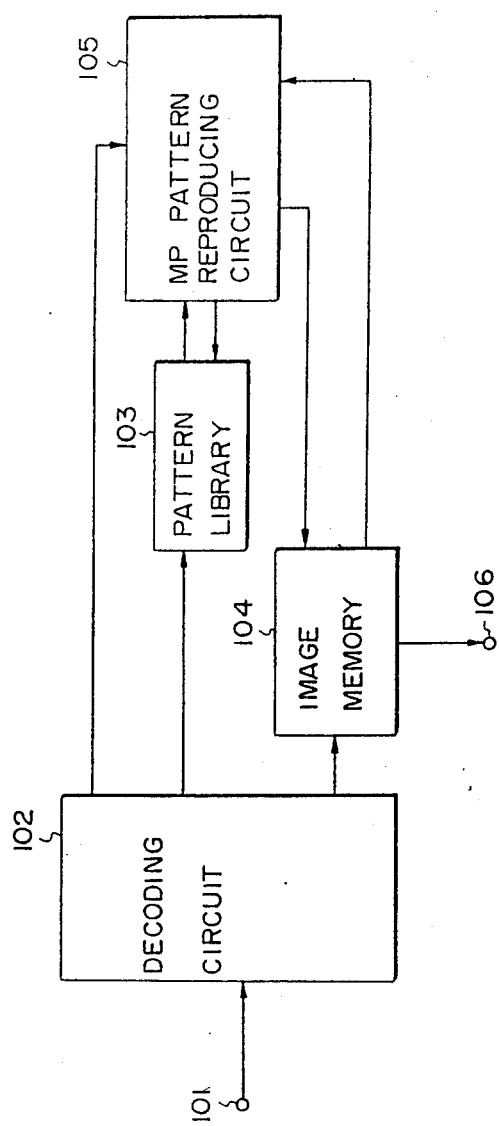
FIG. 4 is a block diagram illustrating an example of a circuit for decoding and reproducing a facsimile signal transmitted according to the present invention.

Next, a description will be given, with reference to FIG. 4, of an example of the arrangement of a decoder for decoding the signal transmitted by the encoding method of the present invention. In FIG. 4, reference numeral 101 indicates an input terminal, 102 a decoding circuit, 103 a pattern library, 104 an image memory, 105 an MP pattern reproducing circuit and 106 an output terminal. The decoding circuit 102 receives the received signal from the input terminal and first decodes the signal portion encoded as by the conventional MR system and provides the decoded signal to the image memory 104. Then it decodes the signal portion related to the LP and sequentially provides the ID, the positional coordinates in the image and the pattern size of the LP to the pattern library 103. The pattern library 103 on the receiving side has only the above three pieces of data but does not register therein the graphic pattern. Next, the decoding circuit 102 decodes the signal portion related to the MP and provides the positional coordinates of the MP and the ID of the LP corresponding to the MP to the MP pattern reconstructing circuit 105. The MP pattern reproducing circuit 105 reads out the data of the LP from the pattern library 103 on the basis of the ID of the LP. This data is the data on the positional coordinates and the size of the LP in the image memory 104. On the basis of this data the graphic pattern of the LP is extracted from the image memory 104. Next, the MP pattern reproducing circuit 105 writes the extracted graphic pattern in the image memory 104 at the position indicated by the positional coordinates of the MP received from the decoding circuit 102. By such processing of the received signal as described above, the image can be reproduced in the image memory 104, and after the processing, the output is provided to the output terminal 106.

(Effect of the Invention)

As described above in detail, according to the present invention, those patterns of the MPs sequentially extracted from the input image which appear only once are basically handled as library patterns to be compared and they are encoded by the conventional encoding system, and only patterns appearing twice or more are encoded on the basis of the data indicating the number of appearances in the library and their positional coordinates and their identification codes are encoded. This achieves a high coding efficiency also for images such as handwritten documents in which the number of appearances of the same pattern is small, and hence offers a facsimile image coding method which is effective for facsimile communications and for storage of facsimile images.

What we claim is:

1. A facsimile image encoding method comprising the steps of: receiving at an input terminal means binary facsimile image signals obtained by scanning an output image;

temporarily storing the received binary facsimile image signals in an output image memory;

sequentially extracting, from the input image memory, matching patterns obtained by blocking the binary facsimile image signals of the input image memory for a predetermined image block;

comparing each one of the extracted matching patterns with previously extracted matching patterns one after another, and registering each one of the matching patterns, in a patterns library, as a new one of library patterns to be used for subsequently effecting said comparison each time when an instant one of the matching patterns is nonidentical with one of the previously extracted matching patterns;

registering, in a code registration circuit, a pair of positional coordinates of an instant one of the matching patterns on the input image and an identification code specifying the instant one of the matching patterns each time when it is decided by said comparison that the instant one of the matching patterns is identical with any one of the library patterns, and erasing, from the input image memory, the instant one of the matching patterns decided as identical with one of the library patterns;

sequentially encoding the binary facsimile image signals remaining without said erasing in the input image memory, the sizes and the identification codes of the library patterns having a plurality of occurrences in the pattern library and the contents of the code registration representative of said positional coordinates, after completion of said extracting the matching patterns from the input image memory.

2. A facsimile image encoding device comprising: input terminal means for receiving a binary facsimile image signals obtained by scanning an input image;

an image storage memory for temporarily storing the binary facsimile image signals;

means for sequentially extracting, from the input image memory, matching patterns obtained by blocking the binary facsimile image signal of the input image memory for a predetermined image block;

means for comparing each one of the extracted matching patterns with previously extracted matching patterns one after another, and means for registering each one of the matching patterns, in a patterns library, as a new one of library patterns to be used for subsequent effecting of said comparison each time when an instant one of the matching patterns is nonidentical with one of the previously extracted matching patterns;

said patterns library; a code registration circuit;

means for registering, in said code registration circuit, a pair of positional coordinates of an instant one of the matching patterns on the input image and an identification code specifying the instant one of the matching patterns each time when it is decided by said comparison that the instant one of the matching patterns is identical with any one of the library patterns, and means for erasing, from the input image memory, the instant one of the matching patterns decided as identical with one of the library patterns;

means for sequentially encoding the binary facsimile image signals remaining without being erased in the input image memory, and the sizes and the identification codes of the library patterns having a plurality of occurrences in the pattern library and the contents of the code registration representative of said positional coordinates, after completion of said extracting the matching patterns from the input image memory.

* * * * *